United States Patent
Minadeo et al.

(10) Patent No.: US 9,447,820 B2
(45) Date of Patent: Sep. 20, 2016

(54) SPACER ASSEMBLY FOR A BEARING

(71) Applicant: General Electric Company, Schenectady, NY (US)

(72) Inventors: Adam Daniel Minadeo, Greenville, SC (US); Biju Nanukuttan, Bangalore (IN)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 14/259,226

(22) Filed: Apr. 23, 2014

(65) Prior Publication Data

US 2015/0308501 A1    Oct. 29, 2015

(51) Int. Cl.

| F16C 33/37 | (2006.01) |
|---|---|
| F16C 33/66 | (2006.01) |
| F16C 33/51 | (2006.01) |
| F16C 19/40 | (2006.01) |
| F16C 39/02 | (2006.01) |
| F16C 19/52 | (2006.01) |
| F16C 21/00 | (2006.01) |

(Continued)

(52) U.S. Cl.
CPC .......... *F16C 33/3706* (2013.01); *F16C 19/40* (2013.01); *F16C 19/522* (2013.01); *F16C 21/00* (2013.01); *F16C 33/6659* (2013.01); *F16C 39/02* (2013.01); *F16C 17/02* (2013.01); *F16C 19/184* (2013.01); *F16C 33/6629* (2013.01); *F16C 2360/31* (2013.01)

(58) Field of Classification Search
CPC F16C 33/6659; F16C 19/38; F16C 2360/31; F16C 33/3706; F16C 33/66; F16C 19/40

USPC .......... 384/51, 470, 520–522, 529–530, 604, 384/609, 614, 551

See application file for complete search history.

(56) References Cited

U.S. PATENT DOCUMENTS 1,125,316 A * 1/1915 Heinzelman ........ F16C 33/4629
                                              384/573
2,893,792 A * 7/1959 Wikoff .................... F16C 19/20
                                              384/520

(Continued)

FOREIGN PATENT DOCUMENTS

DE    4236847 A1 *  5/1994 .............. F16C 19/40
EP    0 608 629 A2    8/1994

(Continued)

OTHER PUBLICATIONS

Related U.S. Appl. No. 14/159,491, filed Jan. 21, 2014.

(Continued)

*Primary Examiner* — Marcus Charles
(74) *Attorney, Agent, or Firm* — Dority & Manning, P.A.

(57) ABSTRACT

A spacer assembly for a bearing of a wind turbine and/or a bearing assembly for a wind turbine is provided. The bearing assembly includes an outer race, an inner race rotatable relative to the outer race, a plurality of roller elements positioned between the inner and outer race, and a plurality of load-bearing spacers configured between the roller elements. Each of the spacers includes a spacer portion and an extension portion. Thus, each of the spacers is arranged to contact adjacent spacers within the bearing assembly via the extension portion such that the extension portions of the spacers are configured to transfer loads experienced by the bearing assembly rather than the loads passing through the roller elements.

16 Claims, 10 Drawing Sheets

(51) Int. Cl.
*F16C 17/02* (2006.01)
*F16C 19/18* (2006.01)

(56) References Cited

U.S. PATENT DOCUMENTS

| | | | | |
|---|---|---|---|---|
| 2,897,021 | A * | 7/1959 | Zeilman | F16C 19/20 384/520 |
| 3,220,785 | A * | 11/1965 | Noll | E02F 9/121 384/604 |
| 3,292,981 | A | 12/1966 | Zaugg | |
| 3,356,428 | A | 12/1967 | Altson | |
| 3,501,212 | A | 3/1970 | Stenert et al. | |
| 6,443,620 | B1 * | 9/2002 | Chiu | F16C 29/064 384/45 |
| 6,513,978 | B2 * | 2/2003 | Shirai | F16C 33/3706 384/45 |
| 6,643,932 | B2 * | 11/2003 | Takagi | F16C 33/3706 29/898.03 |
| 6,644,140 | B2 * | 11/2003 | Akido | F16C 33/3706 384/51 |
| 6,742,931 | B2 * | 6/2004 | Chou | F16C 29/0609 384/45 |
| 6,821,604 | B2 * | 11/2004 | Kasuga | F16C 29/06 384/43 |
| 7,159,484 | B2 * | 1/2007 | Ohkubo | F16C 19/20 384/520 |
| 7,207,235 | B2 * | 4/2007 | Yamamoto | B62D 5/0448 74/424.82 |
| 7,458,722 | B2 * | 12/2008 | Chen | F16C 29/0685 384/446 |
| 7,703,985 | B2 | 4/2010 | Olsen | |
| 8,047,792 | B2 | 11/2011 | Bech et al. | |
| 8,167,501 | B2 * | 5/2012 | Perkinson | F16C 33/3706 384/521 |
| 8,174,144 | B2 | 5/2012 | Nies | |
| 8,414,192 | B2 * | 4/2013 | Sekimoto | F16C 33/3812 384/523 |
| 8,840,315 | B2 * | 9/2014 | Stork | B25B 7/00 384/573 |
| 2006/0196292 | A1 * | 9/2006 | Tsou | F16C 33/3706 74/424.88 |
| 2011/0311175 | A1 | 12/2011 | Damato et al. | |

FOREIGN PATENT DOCUMENTS

| | | | | |
|---|---|---|---|---|
| FR | WO 2012155945 | * | 11/2012 | F16C 19/38 |
| JP | 2000291668 A | * | 10/2000 | |
| JP | 2002310169 A | * | 10/2002 | |
| JP | 2003184886 A | * | 7/2003 | |
| JP | 2003222139 A | * | 8/2003 | |
| JP | 2003222140 A | * | 8/2003 | |
| JP | 2009030673 A | * | 2/2009 | |
| JP | 2010025306 A | * | 2/2010 | |
| JP | 2013096505 A | * | 5/2013 | |
| WO | WO 2013/029684 A1 | | 3/2013 | |

OTHER PUBLICATIONS

European Search Report and Opinion issued in connection with corresponding EP Application No. 15164301.2 on Sep. 18, 2015.

* cited by examiner

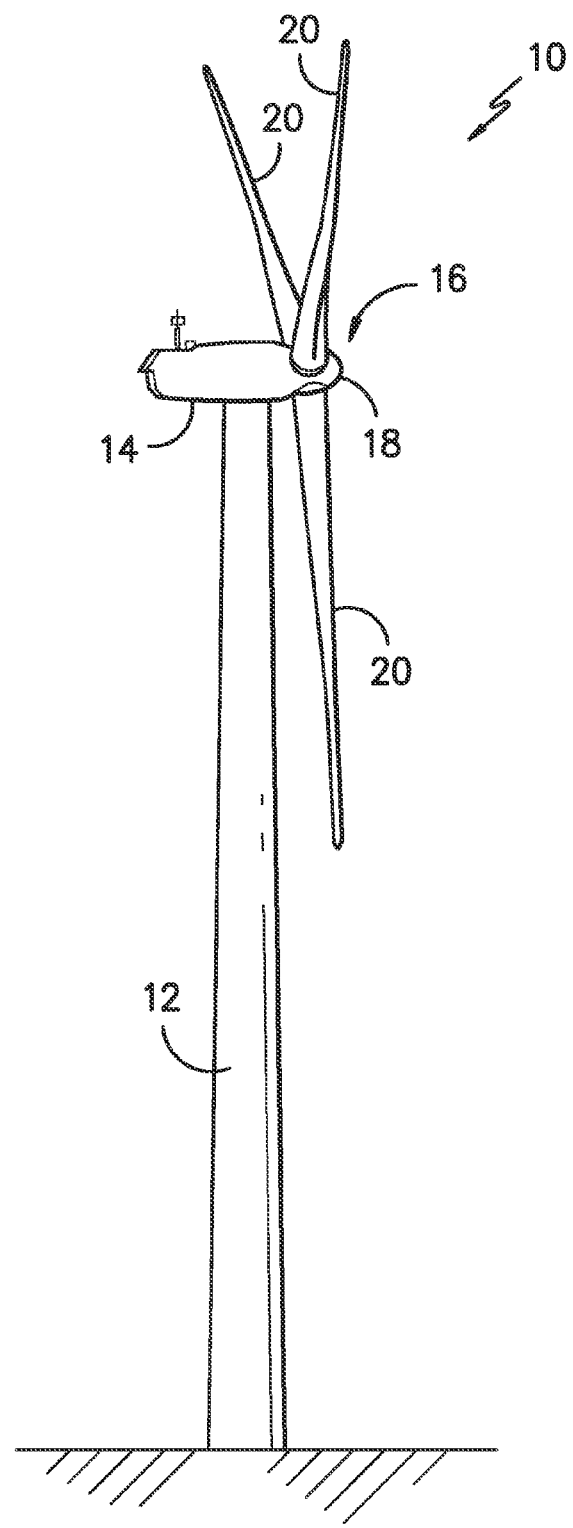
FIG. -1-

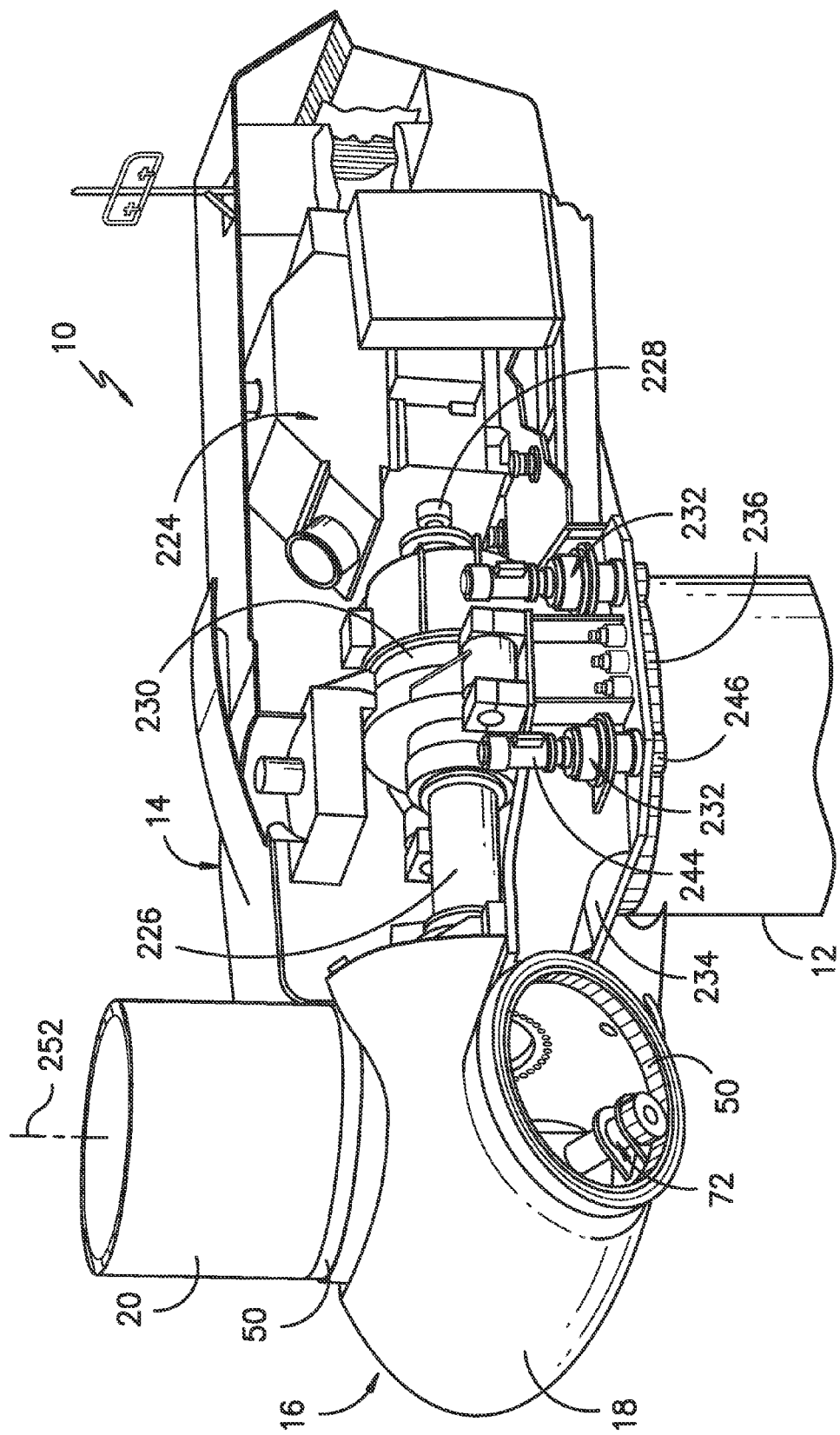
FIG. -2-

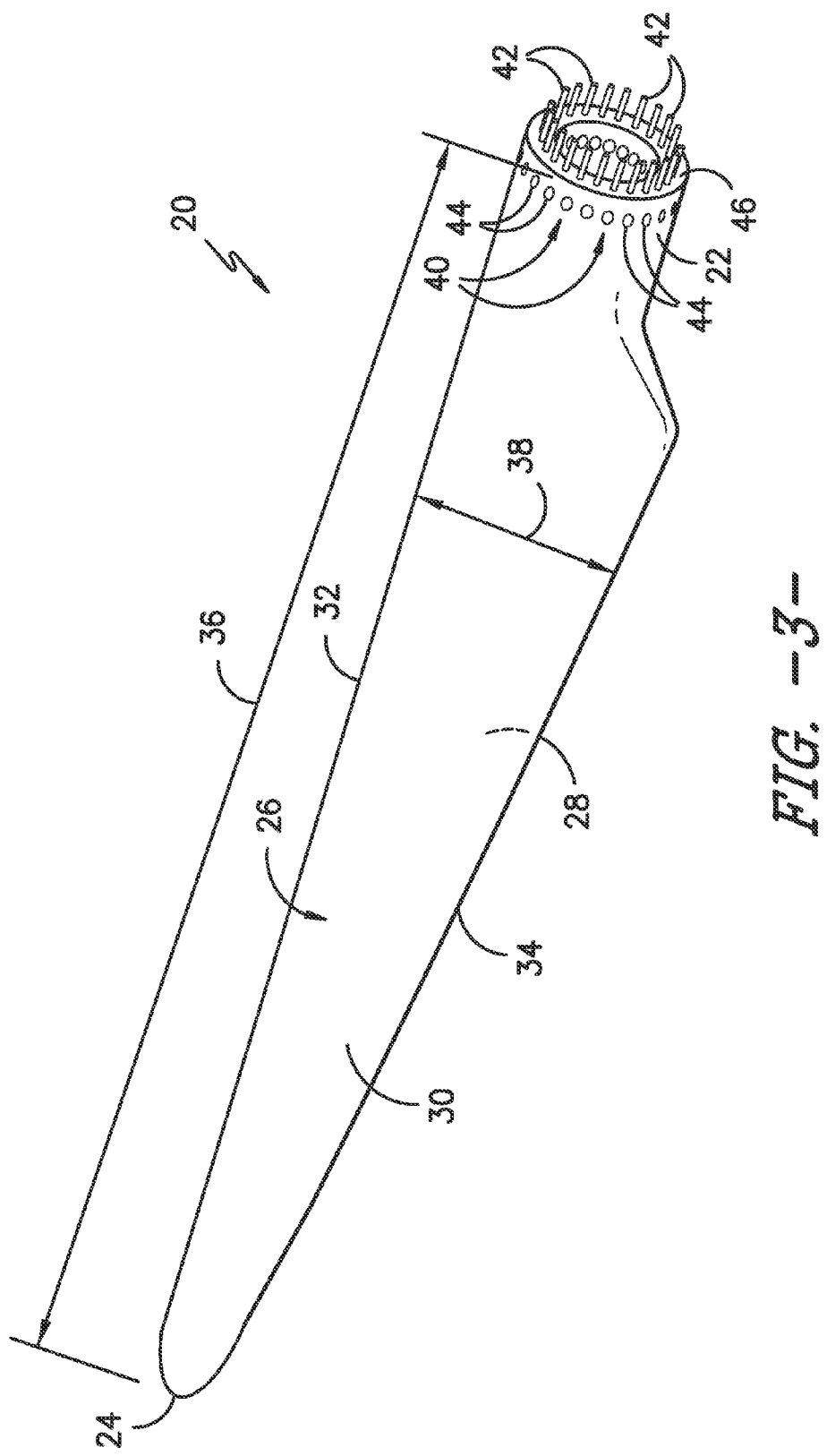
FIG. -3-

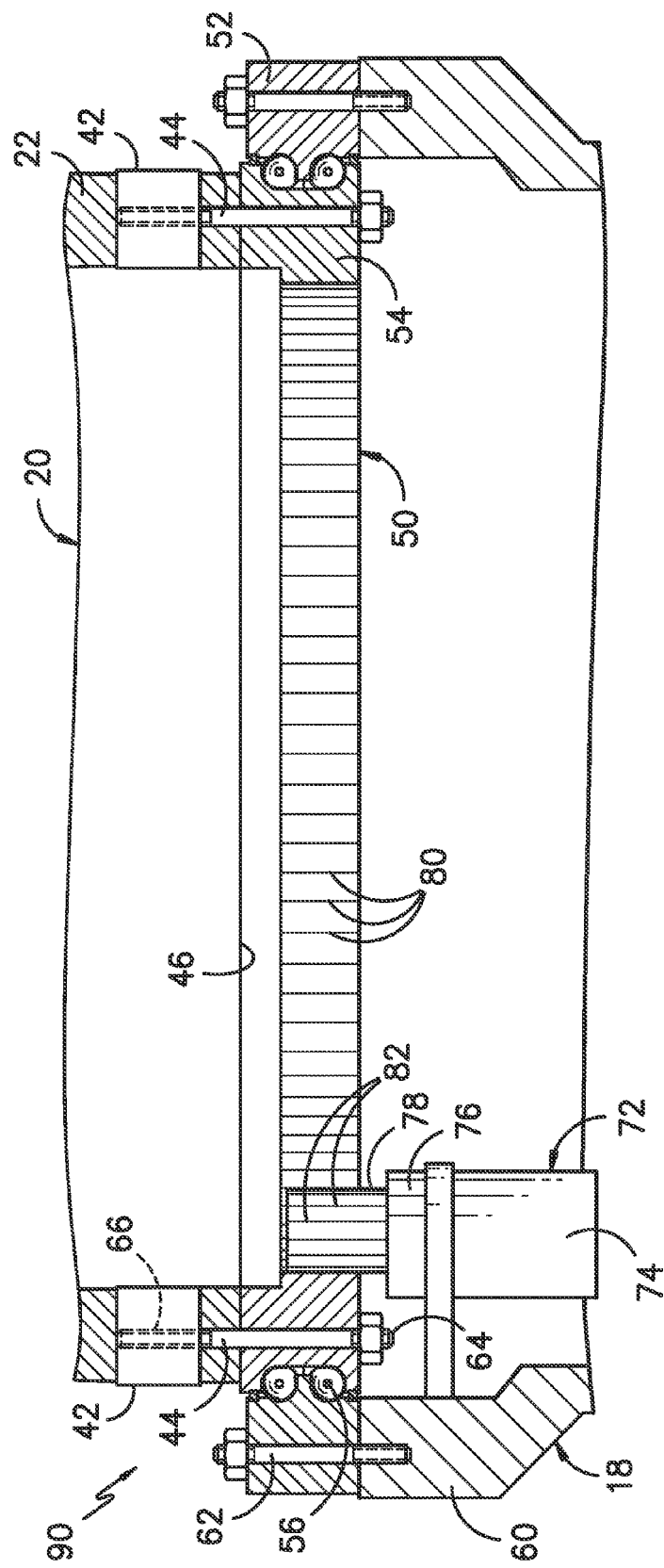
FIG. -4-

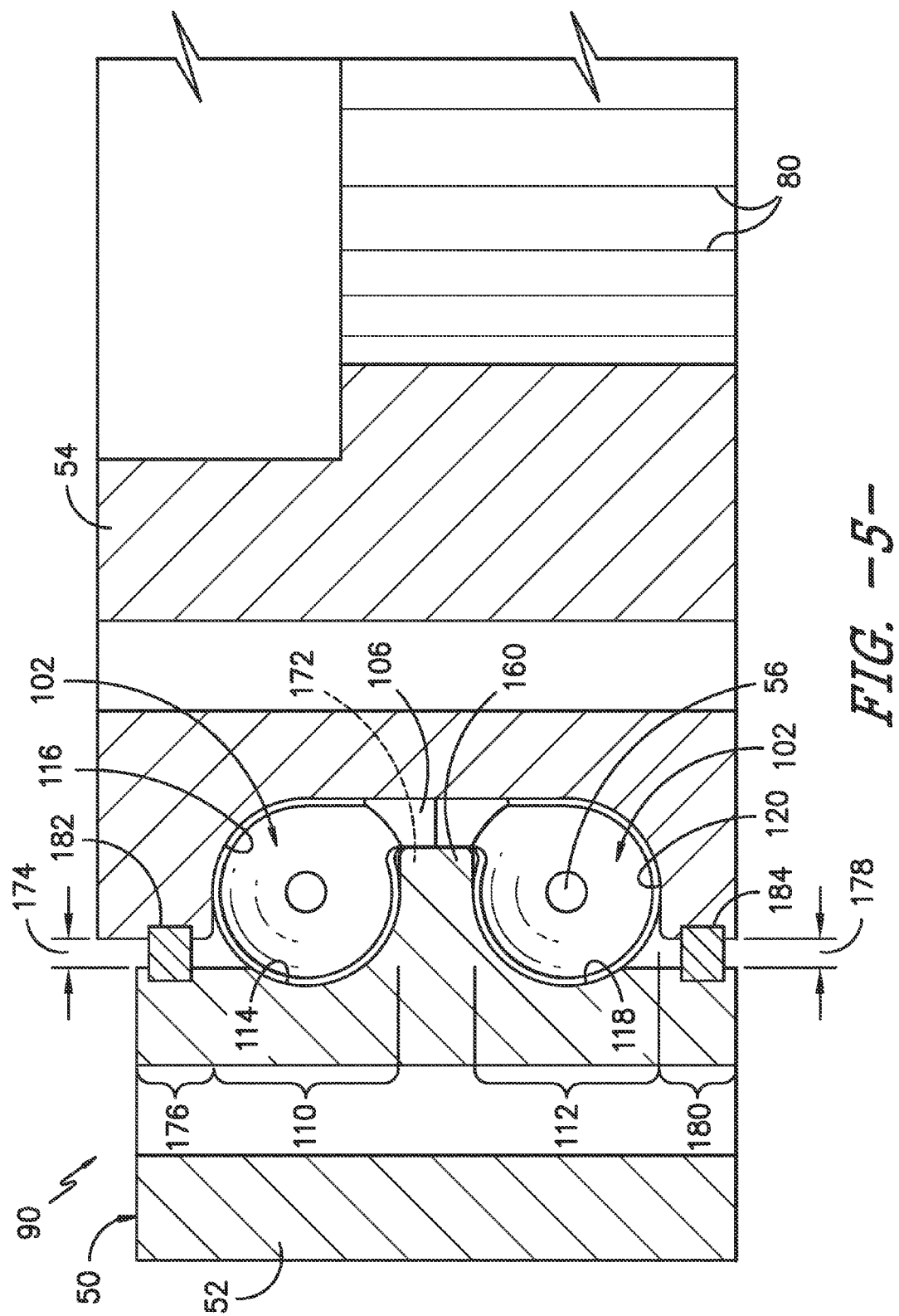
FIG. -5-

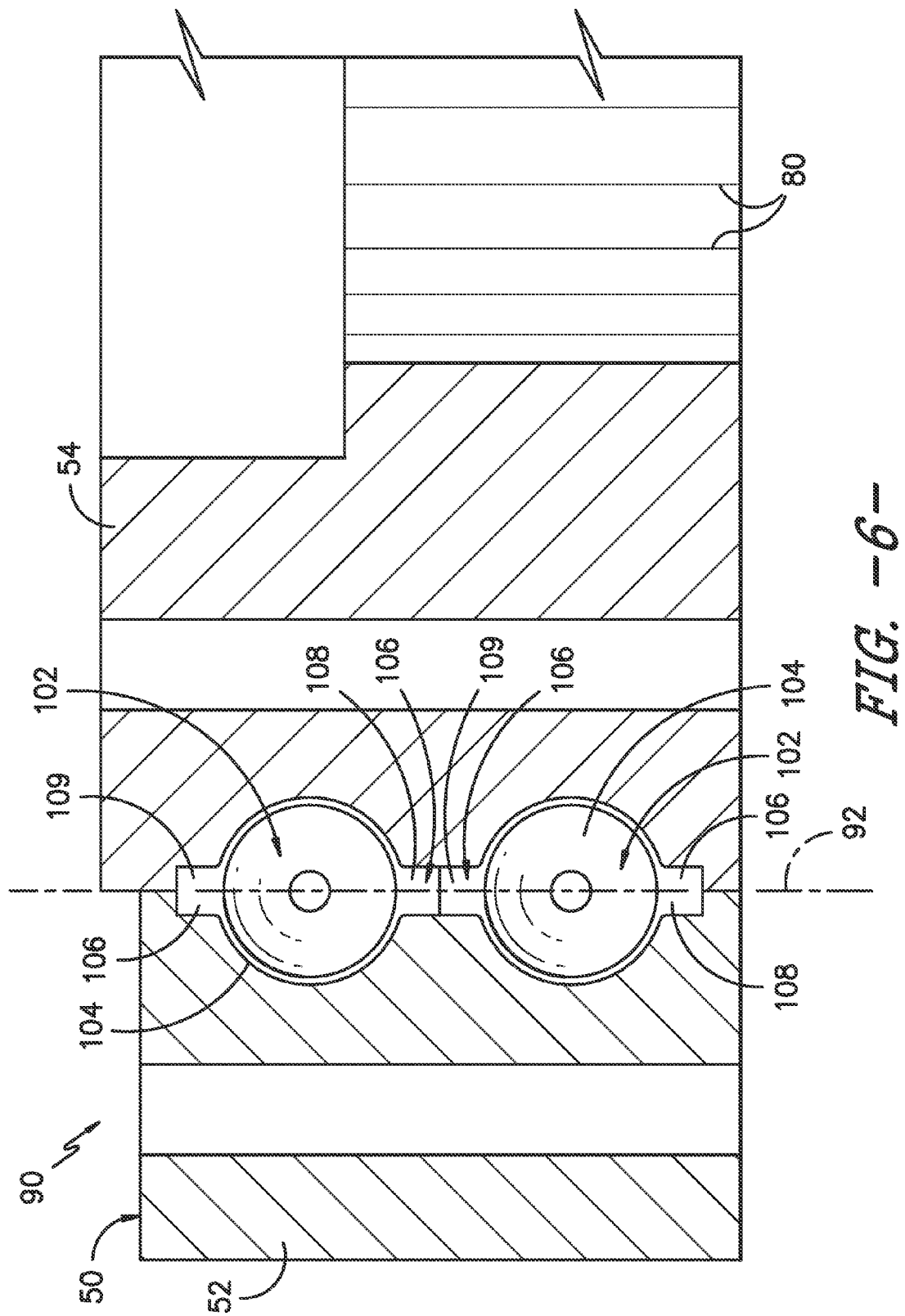

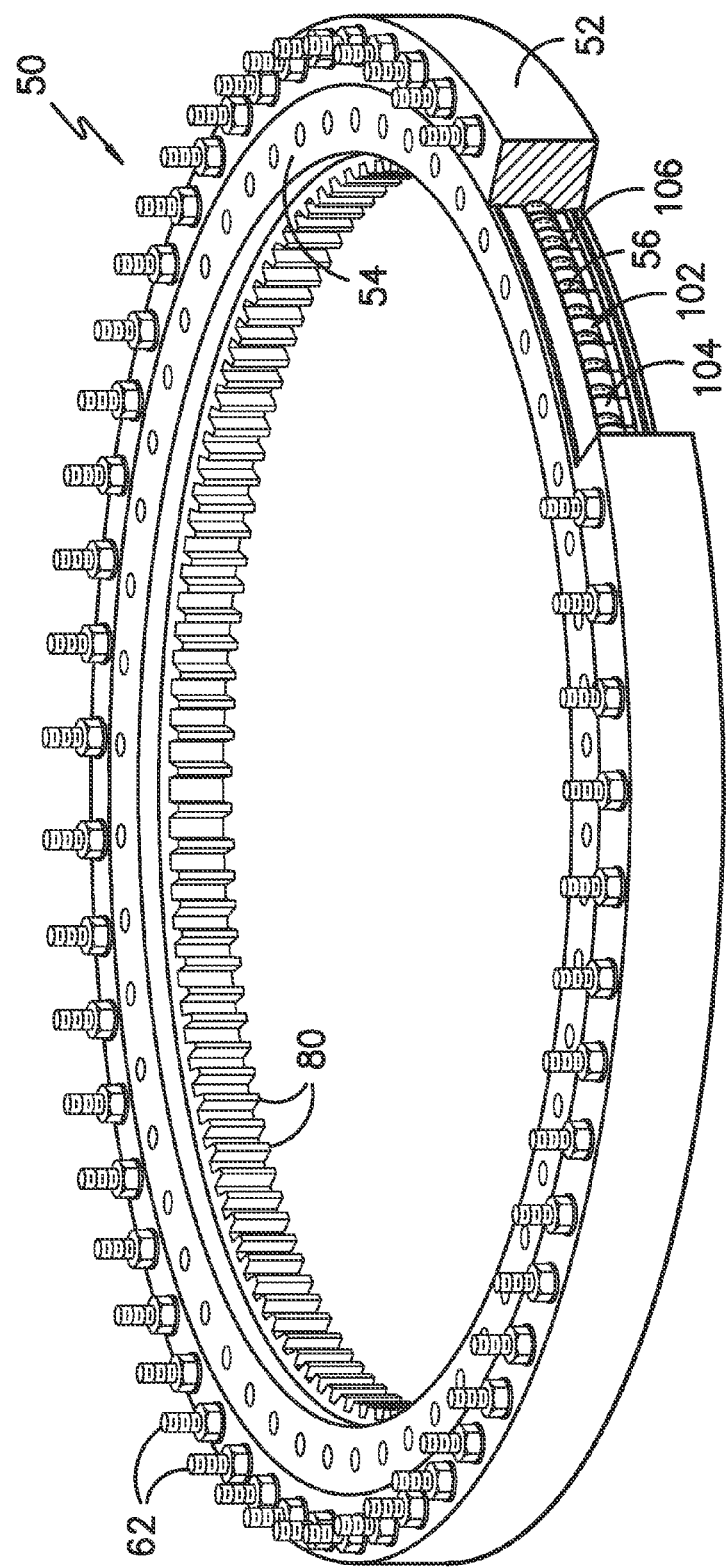
FIG. -7-

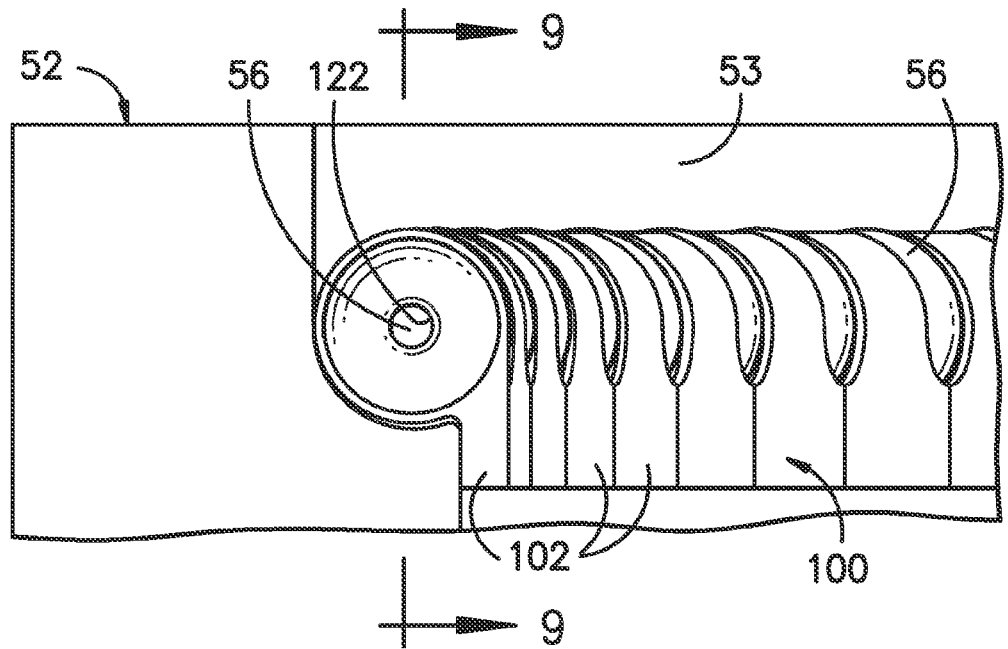
FIG. -8-
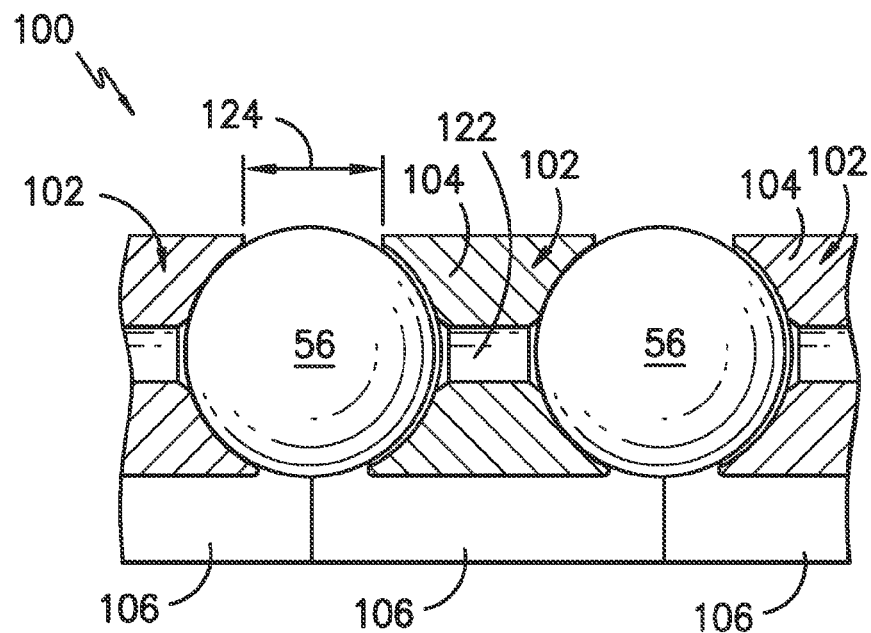
FIG. -9-

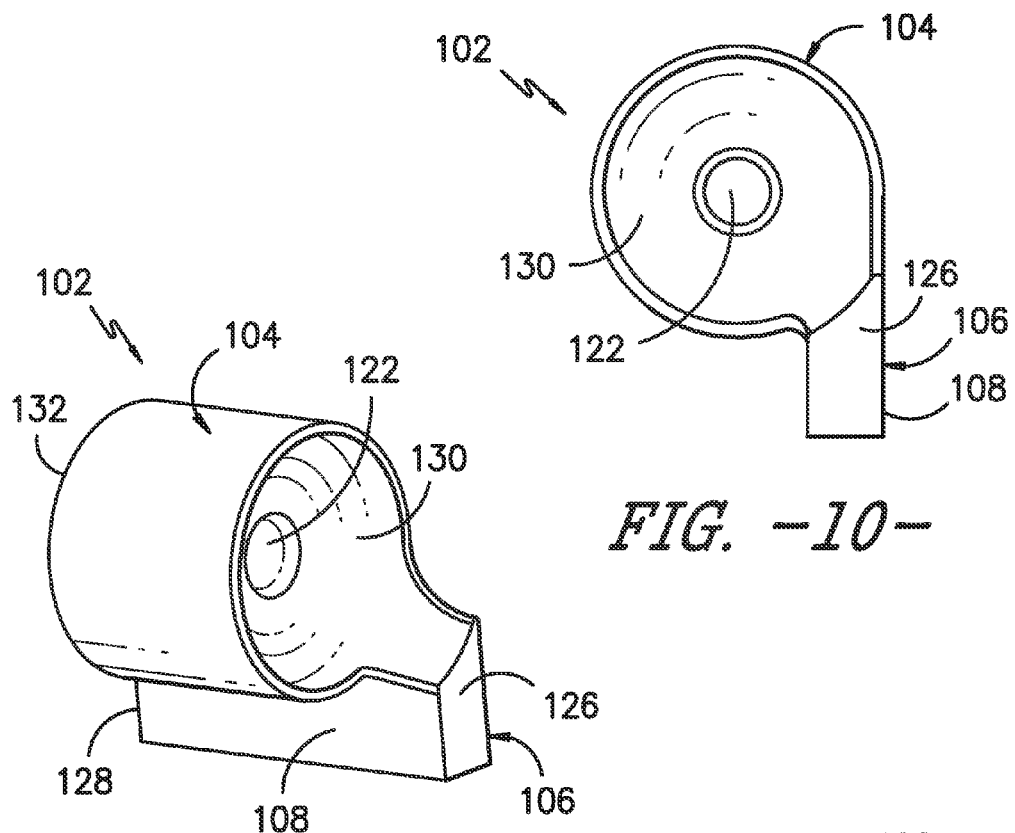
FIG. -10-
FIG. -11-
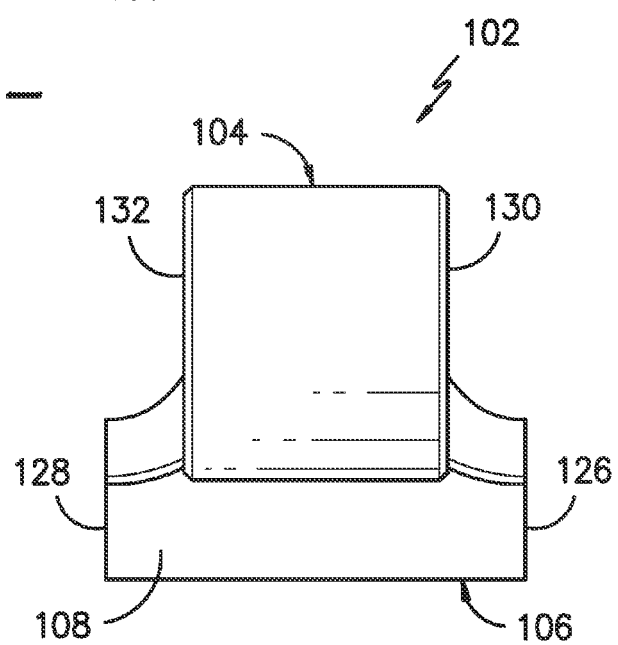
FIG. -12-

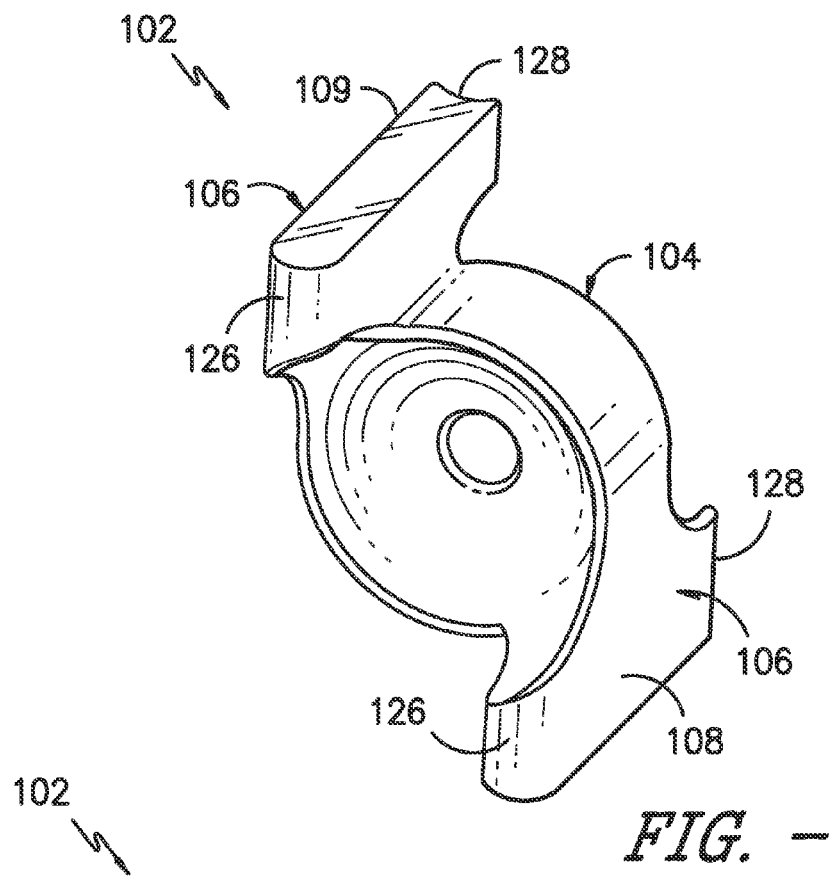
FIG. -13-
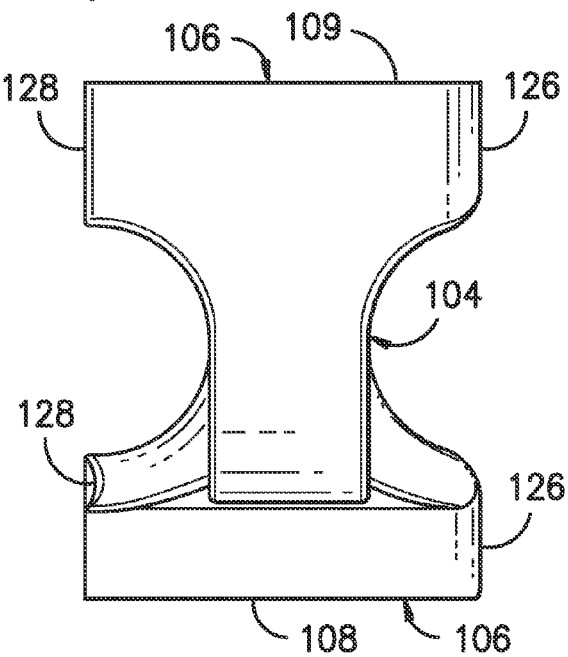
FIG. -14-

SPACER ASSEMBLY FOR A BEARING

FIELD OF THE INVENTION

The present subject matter relates generally to bearings and, more particularly, to spacer assemblies for bearings.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. The yaw and/or pitch bearings are typically slewing bearings which are rotational roller-element bearings that typically support a heavy but slow-turning or slow-oscillating load. As such, yaw bearings permit rotation of the nacelle and are mounted between the tower and the nacelle, whereas pitch bearings permit rotation of the rotor blades and are mounted between the rotatable hub and one of the rotor blades. Typical yaw and/or pitch bearings include an outer and inner race with a plurality of roller elements (e.g. balls) configured between the races.

As wind turbines continue to increase in size, the slewing bearings must similarly increase in size due to increased loading. Further, in order for the slewing bearing to withstand such loading, it must include various components that can adequately react to the increased loads. Thus, for example, conventional bearings typically include spacers between each of the roller elements to maintain uniform loading throughout the bearing. The oscillation of the bearing can tend to cause ball bunching, which can negatively affect the power necessary to turn the bearing, e.g. by driving up torque. To address the above issues, modern wind turbine bearings employ a cage design constructed of single- or multi-piece elements. However, the cage design can potentially lead to other issues detrimental to the bearing effectiveness. The bearings as described herein are typically very expensive and can be difficult to access and replace. As such, failure of the bearings can result in a lengthy and expensive repair process.

Accordingly, an improved bearing assembly that addressed the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a bearing assembly for a wind turbine. The bearing assembly includes an outer race, an inner race rotatable relative to the outer race, a plurality of roller elements positioned between the inner and outer race, and a plurality of load-bearing spacers configured between the roller elements. Each of the spacers includes a spacer portion and an extension portion. The extension portion of each spacer is configured to contact adjacent spacers within the bearing assembly. Thus, the extension portions of the spacers are configured to transfer loads experienced by the bearing assembly rather than the loads passing through the roller elements.

In one embodiment, the spacer portion has a cylindrical body with a pair of concave surfaces on opposing sides of the cylindrical body, such that an adjoining pair of spacers includes opposed concave surfaces adapted to receive one of the roller elements therebetween. In another embodiment, the spacer portions may also include a lubricant opening that allows a lubricant to flow between the spacers and the roller elements.

In additional embodiments, the extension portions include a first extension member extending from a first side of the spacer portion in a first direction. In another embodiment, the first direction is tangential to the spacer portion. In a further embodiment, the extension portion further includes a second extension member extending from a second, opposite side of the spacer portion such that the second extension member extends in an opposite direction from the first direction.

In still further embodiments, each of the extension portions of the spacers may include opposing end faces, wherein the end faces of one of the extension portions is configured to abut against the end faces of adjacent extension portions. In a particular embodiment, one of the opposing end faces of the extension portion may include a convex surface, whereas the other end face may include a concave surface. In another embodiment, the spacer portions of each spacer may be separated by a gap when the spacers are arranged in the bearing assembly.

In various embodiments, the plurality of roller elements may include at least one of the following: a ball, a sphere, a roller, a tapered roller, a barrel-shaped roller, a cylindrical element, or similar. In addition, the bearing assembly as described herein may be utilized in any suitable bearing application, including, but not limited to a pitch bearing or a yaw bearing of a wind turbine.

In another aspect, the present subject matter is directed to a spacer assembly for a roller-element bearing. The roller-element bearing may be any suitable bearing, including, but not limited to a pitch bearing or a yaw bearing of a wind turbine. The spacer assembly is configured to maintain separation between adjacent roller elements of the bearing. Further, the spacer assembly includes a plurality of load-bearing spacers. Each of the spacers includes a spacer portion configured to receive at least a portion of one of the roller elements and an extension portion configured to contact adjacent spacers within the rolling-element bearing. As such, the extension portions are configured to transfer loads experienced by the bearing rather than the loads passing through the roller elements. It should be understood that the spacer assembly may further include any one of or a combination of the features and/or embodiments as described herein.

In yet another aspect, the present subject matter is directed to a load-bearing spacer for a rolling-element bearing. The roller-element bearing may be any suitable bearing, including, but not limited to a pitch bearing or a yaw bearing of a wind turbine. The spacer includes a spacer portion and an extension portion. The spacer portion has a cylindrical body with a pair of concave surfaces on opposite ends of the body. The concave surfaces are adapted to receive a portion one of the roller elements therebetween. The extension portion is configured to contact adjacent spacers within the rolling-element bearing. Thus, the extension portions are configured to transfer loads experienced by the bearing rather than the loads passing through the roller elements. It should be understood that the spacer may further include any one of or a combination of the features and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of the nacelle of the wind turbine shown in FIG. 1

FIG. 3 illustrates a perspective view of one of the rotor blades of the wind turbine shown in FIG. 1;

FIG. 4 illustrates a cross-sectional view of one embodiment of a rotor blade coupled to a wind turbine hub via a bearing assembly according to the present disclosure;

FIG. 5 illustrates a detailed, cross-sectional view of a portion of the bearing assembly shown in FIG. 4;

FIG. 6 illustrates a detailed, cross-sectional view of a portion of another embodiment of the bearing assembly according to the present disclosure;

FIG. 7 illustrates a perspective, partially cut-away view of one embodiment of a bearing assembly according to the present disclosure;

FIG. 8 illustrates a partial, perspective view of one embodiment of the bearing assembly with the inner race removed to further illustrate details of the spacer assembly according to the present disclosure;

FIG. 9 illustrates a side, cross-sectional view of one embodiment of the spacer assembly according to the present disclosure;

FIG. 10 illustrates a front view of one embodiment of a spacer according to the present disclosure;

FIG. 11 illustrates a side, perspective view of the embodiment of FIG. 10;

FIG. 12 illustrates another side, perspective view of the embodiment of FIG. 10;

FIG. 13 illustrates a perspective view of another embodiment of a spacer according to the present disclosure; and, FIG. 14 illustrates a side, perspective view of the embodiment of FIG. 13.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a spacer and/or bearing assembly for a wind turbine. The bearing assembly generally includes a bearing having an inner and outer race, a plurality of roller elements positioned between the inner and outer races, and a plurality of load-bearing spacers configured between the roller elements. Each of the spacers includes a spacer portion and an extension portion and are arranged to contact adjacent spacers via the extension portions. Thus, the loads experienced by the bearing assembly are transferred through the extension portions (or "feet") of the spacers rather than through the roller elements themselves. In certain embodiments, each of the spacer portions includes a cylindrical body with a pair of concave surfaces such that an adjoining pair of spacers has opposed concave surfaces adapted to receive one of the roller elements therebetween. Further, the space that receives one of the roller elements may be sized to define a diameter that is larger than a diameter of one of the roller elements.

The spacer and/or bearing assembly of the present disclosure provides numerous advantages not present in the cited art. For example, the spacers are capable of transferring loads within the bearing assembly, thereby preventing an increase in torque which can lead to bearing failure. Further, due to the spacers contacting one another via their extension portions rather than the ball element pocket, the ball elements are not pressed against adjacent ball elements and/or the raceways of the inner and outer race. Thus, the ball elements are allowed to freely rotate within the bearing assembly due to the diameter of each of the roller elements being less than the diameter defined by the adjoining pair of spacers having opposed concave surfaces. In addition, the spacers described herein are resistant to wear. Moreover, the spacers are prevented from overlapping one another due to the extension portions contacting one another. Further, the spacer assembly described herein reduces friction in the bearing, as well as the effect of ball bunching. In addition, it should be understood that the spacer and/or bearing assembly of the present disclosure may be designed to function in combination with conventional slewing bearings and/or modified slewing bearings such that the slewing bearing can accommodate the unique features of various embodiments of the spacers described herein.

The present invention is described herein as it may relate to wind turbine bearings, including, at least, yaw bearings, pitch bearings, and/or similar. It should be appreciated, however, that the unique spacer and/or bearing assembly in accordance with principles of the invention is not limited to use with a wind turbine, but is applicable to any suitable bearing application. For example, it should be understood that the spacer assembly as described herein is configured to fit within conventional slewing bearings and/or modified slewing bearings known in the art and later developed and are not limited to a specific slewing bearing configuration.

Referring now to the drawings, FIG. 1 illustrates a side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 224 (FIG. 2) positioned within the nacelle 14 to permit electrical energy to be produced.

Referring now to FIG. 2, a simplified, internal view of one embodiment of the nacelle 14 of the wind turbine 10 shown in FIG. 1 is illustrated. As shown, a generator 224 may be disposed within the nacelle 16. In general, the generator 224 may be coupled to the rotor 16 of the wind turbine 10 for generating electrical power from the rotational energy generated by the rotor 16. For example, the rotor 16 may include a rotor shaft 226 coupled to the hub 18 for rotation therewith. The generator 224 may then be coupled to the rotor shaft 226 such that rotation of the rotor shaft 226 drives the generator 224. For instance, in the illustrated embodiment, the generator 224 includes a generator shaft 228 rotatably coupled to the rotor shaft 226 through a gearbox 230. However, in other embodiments, it should be appreciated that the generator shaft 228 may be rotatably coupled directly to the rotor shaft 226. Alternatively, the generator 224 may be directly rotatably coupled to the rotor shaft 226 (often referred to as a "direct-drive wind turbine").

Additionally, the wind turbine 10 may include one or more yaw drive mechanisms 232 mounted to and/or through a bedplate 234 positioned atop the wind turbine tower 12. Specifically, each yaw drive mechanism 232 may be mounted to and/or through the bedplate 234 so as to engage a yaw bearing 236 coupled between the bedplate 234 and the tower 12 of the wind turbine 10. The yaw bearing 236 may be mounted to the bed plate 234 such that, as the yaw bearing 236 rotates about a yaw axis (not shown) of the wind turbine 10, the bedplate 234 and, thus, the nacelle 14 are similarly rotated about the yaw axis.

In general, it should be appreciated that the yaw drive mechanisms 232 may have any suitable configuration and may include any suitable components known in the art that allow such mechanisms 232 to function as described herein. For example, as shown in FIG. 2, each yaw drive mechanism 232 may include a yaw motor 244 mounted to the bedplate 234. The yaw motor 244 may be coupled to a yaw gear 246 (e.g., a pinion gear) configured to engage the yaw bearing 236. For instance, the yaw motor 244 may be coupled to the yaw gear 246 directly (e.g., by an output shaft (not shown) extending through the bedplate 234) or indirectly through a suitable gear assembly coupled between the yaw motor 244 and the yaw gear 246. As such, the torque generated by the yaw motor 244 may be transmitted through the yaw gear 246 and applied to the yaw bearing 236 to permit the nacelle 14 to be rotated about the yaw axis of the wind turbine 10. It should be appreciated that, although the illustrated wind turbine 10 is shown as including two yaw drive mechanisms 232, the wind turbine 10 may generally include any suitable number of yaw drive mechanisms 232.

Similarly, it should be appreciated that the yaw bearing 236 may generally have any suitable configuration, including one or more of the bearing configurations described below. For instance, in several embodiments, the yaw bearing 236 may include an inner race and an outer race rotatable relative to the inner race, with one or more rows of roller elements being disposed between the inner and outer races. In such embodiments, the yaw gear 246 may be configured to engage the outer race of the yaw bearing 236 such that the outer race is rotated relative to the inner race to adjust the orientation of the nacelle 14 relative to the direction of the wind.

Referring still to FIG. 2, the wind turbine 10 may also include a plurality of pitch bearings 50, with each pitch bearing 50 being coupled between the hub 18 and one of the rotor blades 20. As will be described below, the pitch bearings 50 may be configured to allow each rotor blade 20 to be rotated about its pitch axis 252 (e.g., via a pitch adjustment mechanism 72), thereby allowing the orientation of each blade 20 to be adjusted relative to the direction of the wind. It should be appreciated that, as used herein, the term "slewing bearing" may be used to refer to the yaw bearing 236 of the wind turbine 10 and/or one of the pitch bearings 50 of the wind turbine 10 or any other similar bearing.

Referring now to FIG. 3, a perspective view of one of the rotor blades 20 shown in FIGS. 1 and 2 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 50), as will be described in greater detail below.

Referring now to FIG. 4, a partial, cross-sectional view of the rotor blade 20 shown in FIG. 3 is illustrated, particularly illustrating the rotor blade 20 mounted onto the hub 18 via bearing assembly 90 configured in accordance with aspects of the present subject matter. As shown, the bearing assembly 90 includes pitch bearing 50 having outer bearing race 52, inner bearing race 54, and a plurality of roller elements 56 disposed between the races 52, 54. The roller elements 56 as described herein may include any one of or combination of the following: one or more balls, spheres, rollers, tapered rollers, barrel-shaped rollers, cylindrical elements, or any other suitable roller elements. In addition, any suitable number of roller elements 56 may be employed. Further, the roller elements 56 may be arranged in any suitable configuration. For example, as shown in FIGS. 4-7, two rows of roller elements 56 are employed, wherein each of the roller elements 56 is circumferentially spaced between the outer and inner races 62, 64. In still further embodiments, a single row or multiple, axially-spaced rows of roller elements 56 may be utilized in the bearing assembly 90 to provide additional strength. For example, in various embodiments, three or more rows of roller elements 56 may be employed.

As shown in the illustrated embodiments, the outer race 52 may generally be configured to be mounted to a hub flange 60 of the hub 18 using a plurality of hub bolts 62 and/or other suitable fastening mechanisms. Similarly, the inner race 54 may be configured to be mounted to the blade root 22 using the root bolts 44 of the root attachment assemblies 40. For example, as shown in FIG. 4, each root bolt 44 may extend between a first end 64 and a second end 66. The first end 64 may be configured to be coupled to a portion of the inner race 54, such as by coupling the first end 64 to the inner race 54 using an attachment nut and/or other suitable fastening mechanism. The second end 66 of each root bolt 44 may be configured to be coupled to the blade root 22 via the barrel nut 42 of each root attachment assembly 40.

As is generally understood, the inner race 54 may be configured to rotate relative to the outer race 52 (via the roller elements 56) to allow the pitch angle of each rotor blade 20 to be adjusted. As shown in FIG. 4, such relative rotation of the outer and inner races 52, 54 may be achieved using a pitch adjustment mechanism 72 mounted within a portion of the hub 18. In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 54. For example, as shown in FIG. 4, a plurality of gear teeth 80 may be formed along the inner circumference of the inner race 54, with the gear teeth 80 being configured to mesh with corresponding gear teeth 82 formed on the pinion 78. Thus, due to meshing of the gear teeth 80, 82, rotation of the pitch drive pinion 78 results in rotation of the inner race 54 relative to the outer race 52 and, thus, rotation of the rotor blade 20 relative to the hub 18.

Referring now to FIG. 5, a close-up, cross-sectional view of the bearing assembly 90 of FIG. 4 is illustrated. As shown, the roller elements 56 are configured to be received within separate raceways defined between the inner and outer races 52, 54. Specifically, a first raceway 110 is defined between the inner and outer races 52, 54 for receiving a first row of roller elements 56 and a second raceway 112 is defined between the inner and outer races 52, 54 for receiving the second row of roller elements 56. In such an embodiment, each raceway 110, 112 may be defined by separate walls of the outer and inner races 52, 54. For instance, as shown in FIG. 5, the first raceway 110 is defined by a first outer raceway wall 114 of the outer race 52 and a first inner raceway wall 116 of the inner race 54. Similarly, the second raceway 112 is defined by a second outer raceway wall 118 of the outer race 54 and a second inner raceway wall 120 of the inner race 54.

In various embodiments, the outer race 52 may also include a raceway rib 160 at least partially dividing the first raceway 110 from the second raceway 112. More specifically, as shown, the raceway rib 160 may form an extension of the outer race 52. For instance, the raceway rib 160 may correspond to a radial projection of the outer race 52 that extends between the first and second rows of roller elements 56 and separates the first outer raceway wall 114 from the second outer raceway wall 118. Alternatively, the raceway rib 160 may be configured to form an extension of the inner race 54. For instance, the raceway rib 160 may correspond to a radial projection of the inner race 54 configured to extend between the first and second rows of roller elements 56 and separate the first inner raceway wall 116 from the second inner raceway wall 118.

Additionally, in several embodiments, a plurality of lubrication ports may be defined through the outer race 52. For instance, in one embodiment, the lubrication ports may be spaced apart circumferentially around the outer circumference of the outer race 52. In general, each lubrication port may be configured to supply a suitable lubricant (e.g., grease, etc.) from a location outside the bearing assembly 90 to a location between the first and second raceways 110, 112.

To maintain the lubricant within the bearing assembly 90, any gaps defined between the outer and inner races 52, 54 may be sealed using suitable sealing mechanisms. For instance, as shown in FIG. 5, the pitch bearing 50 includes a first gap 174 defined between the outer and inner races 52, 54 along an upper portion 176 of the bearing 50 and a second gap 178 defined between the outer and inner races 52, 54 along a lower portion 180 of the bearing 50. In such an embodiment, a first sealing mechanism 182 may be disposed directly between the outer inner races 52, 54 to seal the first gap 174 and a second sealing mechanism 184 may be disposed directly between the outer and inner races 52, 54 to seal the second gap 178.

Referring generally to FIGS. 5-9, various views of the bearing and/or spacer assembly according to the present disclosure are illustrated. As shown, the roller elements 56 contained within each row may be spaced apart circumferentially from one another via the load-bearing spacer assembly 100. More specifically, the spacer assembly 100 generally includes a plurality of spacers 102 spaced between the roller elements 56. Further, as depicted in the illustrated embodiments, each spacer 102 generally includes a spacer portion 104 and an extension portion 106. Thus, each spacer 102 contacts adjacent spacers 102 via the extension portions 106. Further, in various embodiments, as shown FIGS. 7-9, the spacer portions 104 of the spacers 102 may be separated by a gap 124 when the extension portions 160 are within the bearing assembly 90. Accordingly, the extension portions 106 transfer loads experienced by the bearing assembly 90 rather than the loads passing through the roller-element pockets and the roller elements 56 themselves. As such, the roller elements 56 are not pressed and can freely rotate within the bearing assembly 90.

Referring to FIGS. 5 and 8-12, various views of one embodiment of the spacer 102 according to the present disclosure are illustrated. As mentioned, each of the spacers 102 includes spacer portion 104 and extension portion 106. In the illustrated embodiments, the spacer portions 104 include a pair of concave surfaces 130, 132 such that an adjoining pair of spacers 102 include opposed concave surfaces adapted to receive one of the roller elements 56 therebetween. In addition, the spacer portions 104 may further include a lubricant opening 122. For example, as shown, the lubricant opening 122 is generally centralized within the spacer portion 104. Thus, the lubricant opening 122 is configured to allow a lubricant injected from the lubrication port to flow between the spacers 102 and the roller elements 56.

In certain embodiments, as generally shown in FIGS. 4-5 and 7-12, the extension portion 106 may include a single extension member 108. Further, the extension member 108 may extend in any suitable direction so as to fit between the inner and outer races 54, 52. For example, as shown in FIGS. 4-5 and 7-12, the extension member 108 extends tangentially from the spacer portion 104 of the spacer 102. Alternatively, as shown in FIG. 6, the extension member 108 may generally extend from a center portion of the spacer portion 104.

In addition embodiments, the extension portion 106 may further include more than one extension member extending from the spacer portion 104 of the spacer 102. For example, as shown in FIGS. 6 and 13-14, the extension portion 106 may include first and second extension members 108, 109. More specifically, as shown, the first and second extension members 108, 109 extend on opposite sides of the spacer portion 104 of the spacer 102. Further, the first extension member 108 extends in a first direction, whereas the second extension member 109 extends in a second, opposite direction. More specifically, as shown in the embodiment of FIG. 6, the first and second extension portions 108, 109 may extend along a common, center line 92 when arranged in the bearing assembly 90. Alternatively, as shown in FIGS. 13 and 14, the first and second extension portions 108, 109 may extend in opposite tangential directions from the spacer portion 104 and may be separated by a distance defined by the spacer portion 104. In various embodiments, the extension portion 106 of the spacer 102 (whether having one or more extension members) is configured to abut against or sit flush with the raceways 114, 116, 118, 120 and/or the raceway rib 160 when assembled in the bearing assembly 90, as shown in FIG. 5.

Referring now to FIGS. 10-14, the extension members 108, 109 include opposing end faces 126, 128. More specifically, the end faces 126, 128 of the extension members 108, 109 are configured to abut against the end faces 126, 128 of adjacent extension members 108, 109. In one embodiment, as shown in FIGS. 10-12, the end faces 126, 128 may be substantially flat surfaces that abut against the flat end faces 126, 128 of adjacent extension members 108, 109. In further embodiments, as shown in FIGS. 13-14, one of the end faces 126 may include a convex surface; whereas the opposite end face 128 may include a concave surface. As such, the convex surface of one of the end faces of the extension portion 106 may correspond to the concave surface of an adjoining end face of an adjacent extension portion 106. In still further embodiments, the end faces 126, 128 may have any suitable configuration such that adjacent spacers 102 may abut against and/or connect to each other, e.g. a dovetail configuration.

It should be understood that the spacers 102 may be constructed of any suitable material and may define any suitable shape, and/or dimensions. For example, in one embodiment, the spacers 102 may be constructed of any suitable metal, rubber, or plastic material, or any other suitable material. More specifically, in various embodiments, the materials of construction of the spacers 102 may include steel, bronze, brass, aluminum, nylon or other substitute materials, Teflon, phenolic resin, polyamide, or any other plastics. As such, in some embodiments, the spacers 102 may be a generally flexible material or may be a generally rigid material. In addition, the spacers 102 may have any suitable shape. For example, as shown in the illustrated embodiments, the spacers 102 are shaped to accommodate a portion of one or more of the roller elements 56, while also being configured to remain in the correct position within the races 52, 54. Further, the spacers 102 may be configured to remain stationary relative to the roller elements 56. For example, in another embodiment, the spacers 102 may have a cylindrical shape with two concave ends or surfaces 130, 132 that correspond to the roller elements 56. As such, the cylindrical diameter may be slightly smaller than the diameter of the rolling element 56 such that the spacer 102 remains in place within the bearing assembly 90. In addition, all of the spacers 102 may have the same dimensions or may each have different dimensions. Thus, the spacers 102 can be designed to provide any suitable distance between adjacent roller elements 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a wind turbine, comprising;
an outer race;
an inner race rotatable relative to the outer race;
a plurality of roller elements positioned between the inner and outer race; and,
a plurality of load-bearing spacers configured between the roller elements, each of the spacers comprising a spacer portion and at least one extension portion,
wherein the extension portion is configured to contact adjacent spacers within the bearing assembly so as to transfer loads experienced by the bearing assembly, the extension portion comprising at least one extension member extending tangentially from the spacer portion.

2. The bearing assembly of claim 1, wherein each of the spacer portions comprises a cylindrical body comprising a pair of concave surfaces such that an adjoining pair of spacers comprises opposed concave surfaces adapted to receive one of the roller elements therebetween.

3. The bearing assembly of claim 1, wherein the spacer portions further comprise a lubricant opening, the lubricant opening configured to allow a lubricant to flow between the spacers and the roller elements.

4. The bearing assembly of claim 1, wherein the extension portion further comprises a second extension member extending from a second, opposite side of the spacer portion, wherein the second extension member extends in an opposite direction from the first direction.

5. The bearing assembly of claim 1, wherein each of the extension portions further comprises opposing end faces, wherein the end faces of one of the extension portions are configured to abut against the end faces of adjacent extension portions.

6. The bearing assembly of claim 5, wherein one of the opposing end faces comprises a convex surface and one of the opposing end faces comprises a concave surface.

7. The hearing assembly of claim 1, wherein the spacer portions of each spacer are separated by a gap when the spacers are arranged in the bearing assembly.

8. The bearing assembly of claim 1, wherein the plurality of roller elements comprise at least one of the following: a ball, a sphere, a roller, a tapered roller, a barrel-shaped roller, or a cylindrical element.

9. A spacer assembly for a roller-element bearing, the spacer assembly configured to maintain separation between adjacent roller elements of the bearing, the spacer assembly comprising:
   a plurality of load-bearing spacers, each of the spacers comprising:
      a spacer portion configured to receive at least a portion of one of the roller elements, and
      at least one extension portion configured to contact adjacent spacers within the roller-element bearing, wherein the extension portions of the spacers are configured to transfer loads experienced by the bearing, each of the extension portions comprising at least one extension member extending tangentially from the spacer portion.

10. The spacer assembly of claim 9, wherein each of the spacer portions comprises a cylindrical body comprising a pair of concave surfaces such that an adjoining pair of spacers comprises opposed concave surfaces adapted to receive one of the roller elements therebetween.

11. The spacer assembly of claim 10, wherein each of the extension portions further comprises opposing end faces, wherein the end faces of one of the extension portion abuts against the end faces of adjacent extension portions.

12. The bearing assembly of claim 11, wherein one of the opposing end faces comprises a convex surface and one of the opposing end faces comprises a concave surface.

13. The bearing assembly of claim 10, wherein the bearing comprises one of a pitch bearing or a yaw bearing.

14. The spacer assembly of claim 10, wherein the plurality of roller elements comprise at least one of the following: a ball, a sphere, a roller, a tapered roller, a barrel-shaped roller, or a cylindrical element.

15. The bearing assembly of claim 11, wherein the extension portion further comprises a second extension member extending from a second, opposite side as the first extension member from the spacer portion.

16. A load-bearing spacer for a roller-element bearing, the spacer comprising:
   a spacer portion comprising a cylindrical body, the cylindrical body comprising a pair of concave surfaces, the concave surfaces adapted to receive a portion one of the roller elements therebetween; and,
   an extension portion configured to contact adjacent spacers within the roller-element bearing, wherein the extension portions are configured to transfer loads experienced by the bearing the extension portion comprising at least one extension member extending tangentially from the spacer portion.

* * * * *